United States Patent
Ohashi et al.

(10) Patent No.: US 12,248,083 B2
(45) Date of Patent: Mar. 11, 2025

(54) COMMUNICATION UNIT, COMMUNICATION DEVICE, AND POSITION ESTIMATING METHOD

(71) Applicant: KABUSHIKI KAISHA TOKAI RIKA DENKI SEISAKUSHO, Aichi (JP)

(72) Inventors: Yosuke Ohashi, Aichi (JP); Masateru Furuta, Aichi (JP); Yuki Kono, Aichi (JP); Shigenori Nitta, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 390 days.

(21) Appl. No.: 17/790,321

(22) PCT Filed: Dec. 2, 2020

(86) PCT No.: PCT/JP2020/044785
§ 371 (c)(1),
(2) Date: Jun. 30, 2022

(87) PCT Pub. No.: WO2021/192421
PCT Pub. Date: Sep. 30, 2021

(65) Prior Publication Data
US 2023/0051782 A1  Feb. 16, 2023

(30) Foreign Application Priority Data
Mar. 23, 2020 (JP) .................. 2020-051717

(51) Int. Cl.
*G01S 5/02* (2010.01)
*H04W 64/00* (2009.01)

(52) U.S. Cl.
CPC ......... *G01S 5/0289* (2013.01); *H04W 64/003* (2013.01)

(58) Field of Classification Search
CPC ........................... G01S 5/0289; H04W 64/003
(Continued)

(56) References Cited

U.S. PATENT DOCUMENTS

| 2003/0181163 A1* | 9/2003 | Ofuji .................. H04W 72/046 455/25 |
| 2014/0330449 A1 | 11/2014 | Oman et al. |

(Continued)

FOREIGN PATENT DOCUMENTS

| JP | 2013-104247 A | 5/2013 |
| JP | 2014-51809 A | 3/2014 |

(Continued)

OTHER PUBLICATIONS

International Search Report issued in International Bureau of WIPO Patent Application No. PCT/JP2020/044785, dated Jan. 26, 2021, along with an English translation thereof.

*Primary Examiner* — Ted M Wang
(74) *Attorney, Agent, or Firm* — Greenblum & Bernstein, P.L.C.

(57) ABSTRACT

A communication unit includes: a plurality of wireless communication units configured to perform wireless communication with another communication device; and a control unit configured to estimate a relative position of the other communication device relative to the communication unit, wherein the control unit estimates the relative position of the other communication device on the basis of a plurality of distance measurement values indicating a distance between each of the plurality of wireless communication units and the other communication device obtained by each of the plurality of wireless communication units performing wireless communication with the other communication device, and a position characteristic including a position of each of the plurality of wireless communication units in the communication unit.

7 Claims, 7 Drawing Sheets

(58) Field of Classification Search
USPC .................................................. 455/456.1
See application file for complete search history.

(56) References Cited

U.S. PATENT DOCUMENTS

2018/0267137 A1* 9/2018 Igura ..................... G01S 5/0289
2020/0298838 A1* 9/2020 Sugae ..................... G08G 1/04

FOREIGN PATENT DOCUMENTS

| | | |
|---|---|---|
| JP | 2014-84595 A | 5/2014 |
| JP | 2015-113643 A | 6/2015 |
| JP | 2019-56636 A | 4/2019 |
| WO | 2018/148687 A1 | 8/2018 |

* cited by examiner

COMMUNICATION UNIT, COMMUNICATION DEVICE, AND POSITION ESTIMATING METHOD

TECHNICAL FIELD

The present invention relates to a communication device and a position estimating method.

BACKGROUND ART

In recent years, distance measurement techniques of measuring a distance to a distance measurement target have been used for various services. For example, the following Patent Literature 1 discloses a technique of measuring a distance between a vehicle and a portable device and determining whether a door is locked or unlocked in accordance with the measured distance or warning that the door is open.

CITATION LIST

Patent Literature

Patent Literature 1 JP 2014-51809A

SUMMARY OF INVENTION

Technical Problem

However, the technique disclosed in Patent Literature 1 merely provides a service according to a simple distance, and thus it is difficult to provide a service according to a more detailed situation.

Consequently, the present invention was contrived in view of the above problem, and an object of the present invention is to provide a mechanism that makes it possible to estimate the position of a distance measurement target in more detail using a distance measurement technique.

Solution to Problem

To solve the above described problem, according to an aspect of the present invention, there is provided a communication unit comprising: a plurality of wireless communication units configured to perform wireless communication with another communication device; and a control unit configured to estimate a relative position of the other communication device relative to the communication unit, wherein the control unit estimates the relative position of the other communication device on the basis of a plurality of distance measurement values indicating a distance between each of the plurality of wireless communication units and the other communication device obtained by each of the plurality of wireless communication units performing wireless communication with the other communication device, and a position characteristic including a position of each of the plurality of wireless communication units in the communication unit.

To solve the above described problem, according to another aspect of the present invention, there is provided a communication device comprising: a wireless communication unit configured to perform wireless communication with a plurality of other wireless communication units provided in another communication device; and a control unit configured to estimate a relative position of the communication device relative to the other communication device, wherein the control unit estimates the relative position of the communication device on the basis of a plurality of distance measurement values indicating a distance between the wireless communication unit and each of the plurality of other wireless communication units obtained by the wireless communication unit performing wireless communication with each of the plurality of other wireless communication units, and a position characteristic including a position of each of the plurality of other wireless communication units in the other communication device.

To solve the above described problem, according to another aspect of the present invention, there is provided a position estimating method comprising estimating a relative position of another communication device relative to a communication unit including a plurality of wireless communication units that perform wireless communication with the other communication device, wherein estimating the relative position of the other communication device includes estimating the relative position of the other communication device on the basis of a plurality of distance measurement values indicating a distance between each of the plurality of wireless communication units and the other communication device obtained by each of the plurality of wireless communication units performing wireless communication with the other communication device, and a position characteristic including a position of each of the plurality of wireless communication units in the communication unit.

To solve the above described problem, according to another aspect of the present invention, there is provided a position estimating method comprising estimating a relative position of a communication device including a wireless communication unit that performs wireless communication with a plurality of other wireless communication units provided in another communication device relative to the other communication device, wherein estimating the relative position of the communication device includes estimating the relative position of the communication device on the basis of a plurality of distance measurement values indicating a distance between the wireless communication unit and each of the plurality of wireless communication units obtained by the wireless communication unit performing wireless communication with each of the plurality of other wireless communication units, and a position characteristic including a position of each of the plurality of other wireless communication units in the other communication device.

Advantageous Effects of Invention

According to the present invention as described above, it is possible to provide a mechanism that makes it possible to identify the position of a distance measurement target in more detail using a distance measurement technique.

DESCRIPTION OF EMBODIMENTS

Figure 1:
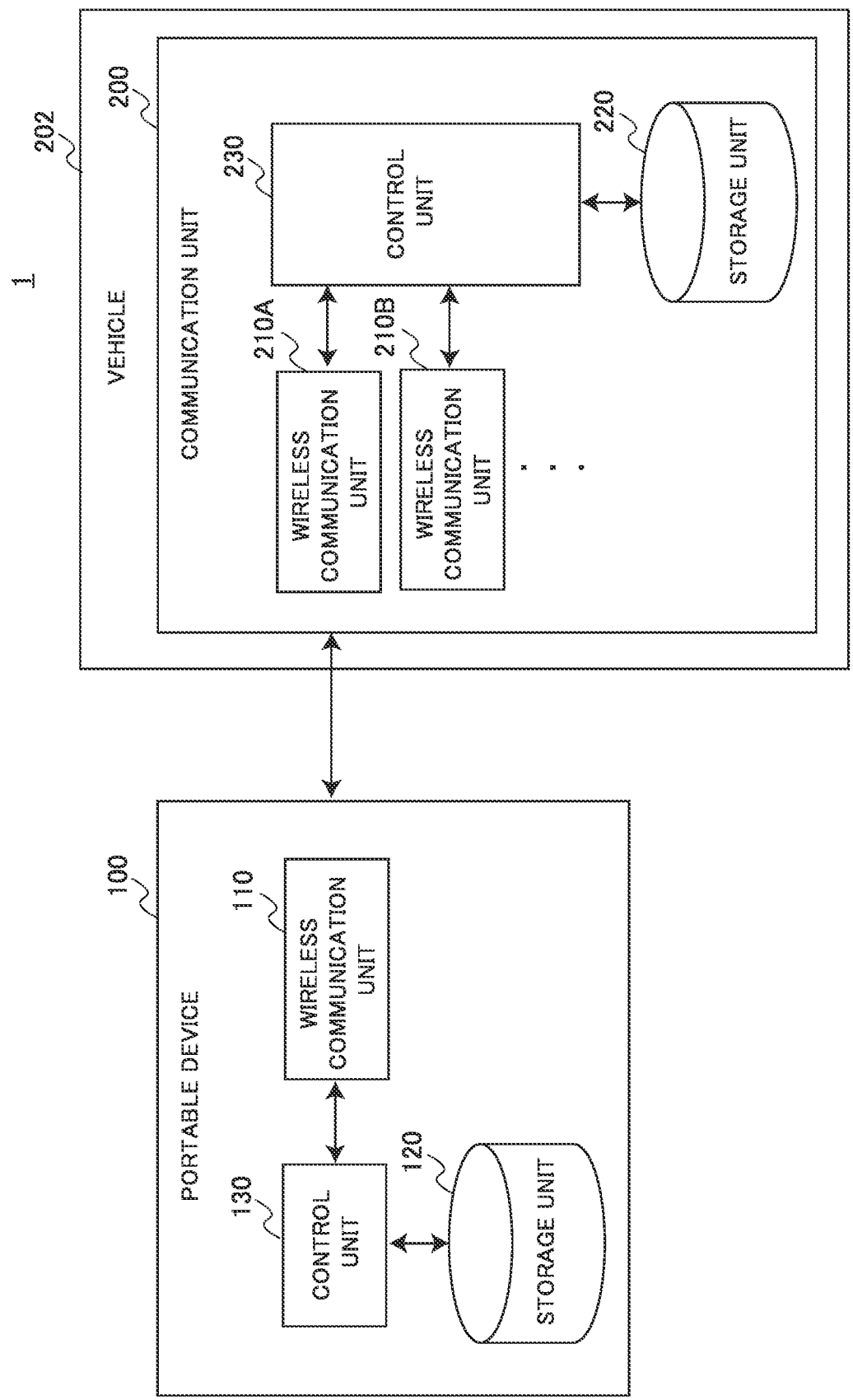
FIG. 1 is a diagram illustrating an example of a configuration of a system according to a first embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Further, in the present specification and the drawings, different alphabets are suffixed to a same reference numeral to distinguish elements which have substantially the same functional configuration. For example, a plurality of elements which have substantially the same functional configuration are distinguished such as wireless communication units 210A, 210B, and 210C, as necessary. However, when there is no need in particular to distinguish elements that have substantially the same functional configuration, the same reference numeral alone is attached. For example, in the case where it is not necessary to particularly distinguish the wireless communication units 210A, 210B, and 210C, the wireless communication units 210A, 210B, and 210C are simply referred to as the wireless communication units 210.

1. First Embodiment

<1.1. Configuration Example>

FIG. 1 is a diagram illustrating an example of a configuration of a system 1 according to an embodiment of the present invention. As shown in FIG. 1, the system 1 according to the present embodiment includes a portable device 100 and a communication unit 200. The communication unit 200 in the present embodiment is mounted in a vehicle 202. The vehicle 202 is an example of a user's usage target.

The present invention involves a communication device on the authenticated person side (hereinafter also referred to as a first communication device) and a communication device on an authenticating person side (hereinafter also referred to as a second communication device). In the example shown in FIG. 1, the portable device 100 is an example of the first communication device, and the communication unit 200 is an example of the second communication device.

In the system 1, when a user (for example, a driver of the vehicle 202) approaches the vehicle 202 while carrying the portable device 100, wireless communication for authentication is performed between the portable device 100 and the communication unit 200 mounted in the vehicle 202. When the authentication is successful, the door lock of the vehicle 202 is unlocked or the engine is started, and the vehicle 202 is made available to the user. Such a system is also referred to as a smart entry system. Hereinafter, each component will be described in order.

(1) Portable Device 100

The portable device 100 is configured as any device which is carried by a user. Examples of any device include an electronic key, a smartphone, a wearable terminal, and the like. As shown in FIG. 1, the portable device 100 includes a wireless communication unit 110, a storage unit 120, and a control unit 130.

Wireless Communication Unit 110

The wireless communication unit 110 has a function of performing wireless communication with the communication unit 200. In particular, the wireless communication unit 110 performs wireless communication with each of the plurality of wireless communication units 210 included in the communication unit 200. The wireless communication unit 110 receives a wireless signal from the communication unit 200. In addition, the wireless communication unit 110 transmits a wireless signal to the communication unit 200.

The wireless communication performed between the wireless communication unit 110 and the communication unit 200 is performed in accordance with any wireless communication standard.

In an example of a wireless communication standard, signals are transmitted and received using an ultra-wide band (UWB). In a case where an impulse system is used in wireless communication of a signal using a UWB, using radio waves having a very short pulse width of nanoseconds or less allows the airborne propagation time of the radio waves to be measured with a high degree of accuracy and allows distance measurement based on the propagation time to be performed with a high degree of accuracy. The distance measurement involves measuring a distance. Meanwhile, "UWB" often refers to a frequency band of approximately 3 GHz to approximately 10 GHz.

The wireless communication unit 110 is configured as, for example, a communication interface capable of communication in a UWB.

Storage Unit 120

The storage unit 120 has a function of storing various types of information for the operation of the portable device 100. For example, the storage unit 120 stores a program for the operation of the portable device 100, an identifier (ID) for authentication, a password, an authentication algorithm, and the like. The storage unit 120 is constituted by, for example, a storage medium such as a flash memory and a processing device that executes recording and reproduction on the storage medium.

Control Unit 130

The control unit 130 has a function of executing processing in the portable device 100. For example, the control unit 130 controls the wireless communication unit 110 to perform wireless communication with the communication unit 200. In addition, information is read out from the storage unit 120 and the information is written to the storage unit 120. In addition, the control unit 130 controls processing for authentication which is performed with the communication unit 200. Examples of the processing for authentication include a distance measurement process to be described later. The control unit 130 is constituted by an electronic circuit such as, for example, a central processing unit (CPU) and a microprocessor.

(2) Communication Unit 200

The communication unit 200 is provided in association with the vehicle 202. Here, it is assumed that the communication unit 200 is mounted in the vehicle 202. As an example, the communication unit 200 may be installed in the interior of the vehicle 202. As another example, the communication unit 200 may be built into the vehicle 202 as a communication module. As shown in FIG. 1, the communication unit 200 includes a plurality of wireless communication units 210 (210A, 210B, and the like), a storage unit 220, and a control unit 230.

Wireless Communication Unit 210

The wireless communication unit 210 has a function of performing wireless communication with the portable device 100. The wireless communication unit 210 receives a wireless signal from the portable device 100. In addition, the wireless communication unit 210 transmits a wireless signal to the portable device 100.

The wireless communication which is performed between the wireless communication unit 210 and the portable device 100 is performed in accordance with any wireless communication standard. Examples of such wireless communication standards include a standard by which a signal is transmitted and received using a UWB. The wireless communication unit 210 is configured as, for example, a communication interface capable of communication in a UWB.

Storage Unit 220

The storage unit 220 has a function of storing various types of information for the operation of the communication unit 200. For example, the storage unit 220 stores a program for the operation of the communication unit 200, an authentication algorithm, and the like. The storage unit 220 is constituted by, for example, a storage medium such as a flash memory and a processing device that executes recording and reproduction on the storage medium.

Control Unit 230

The control unit 230 has a function of controlling the overall operation of the communication unit 200 and vehicle-mounted instruments mounted in the vehicle 202. For example, the control unit 230 controls the wireless communication unit 210 to communicate with the portable device 100. In addition, the control unit 230 reads out information from the storage unit 220 and writes the information to the storage unit 220. In addition, the control unit 230 controls processing for authentication which is performed with the portable device 100. Examples of the processing for authentication include a distance measurement process and a relative position estimation process which will be described later.

In addition, the control unit 230 also functions as a door lock control unit that controls the door lock of the vehicle 202, and locks and unlocks the door lock. In addition, the control unit 230 also functions as an engine control unit that controls the engine of the vehicle 202, and starts/stops the engine. Meanwhile, a power source included in the vehicle 202 may be a motor or the like in addition to the engine. The control unit 230 is configured as an electronic circuit such as, for example, an electronic control unit (ECU).

<1.2. Technical Feature>

(1) Distance Measurement Process

The portable device 100 and the communication unit 200 perform a distance measurement process. The distance measurement process is a process of measuring a distance between the portable device 100 and the communication unit 200. More precisely, the distance measurement process is a process of measuring a distance between the wireless communication unit 110 of the portable device 100 and the wireless communication unit 210 of the communication unit 200. The distance measured in the distance measurement process is also referred to as a distance measurement value below.

In the distance measurement process, a signal for the distance measurement process can be transmitted and received.

An example of the signal for the distance measurement process is a signal for distance measurement. The signal for distance measurement is a signal which is transmitted and received to measure a distance between devices. The signal for distance measurement is also a signal to be measured. For example, the time taken to transmit and receive the signal for distance measurement is measured. Typically, the signal for distance measurement is constituted of a frame format that does not have a payload portion for storing data. Naturally, the signal for distance measurement may be constituted of a frame format that has a payload portion for storing data.

In the distance measurement process, a plurality of signal for distance measurement can be transmitted and received between devices. A signal for distance measurement which is transmitted from one device to the other device among the plurality of signals for distance measurement is also referred to as a first signal for distance measurement. A signal for distance measurement which is transmitted from a device that has received the first signal for distance measurement to a device that has transmitted the first signal for distance measurement is also referred to as a second signal for distance measurement.

Another example of the signal for the distance measurement process is a data signal. The data signal is a signal for storing and transporting data. The data signal is constituted of a frame format that has a payload portion for storing data.

In the distance measurement process, the distance between the wireless communication unit 110 and the wireless communication unit 210 that have transmitted and received the signal for distance measurement is measured as the distance between the portable device 100 and the communication unit 200.

An example of the distance measurement process will be described with reference to FIG. 2.

Figure 2:
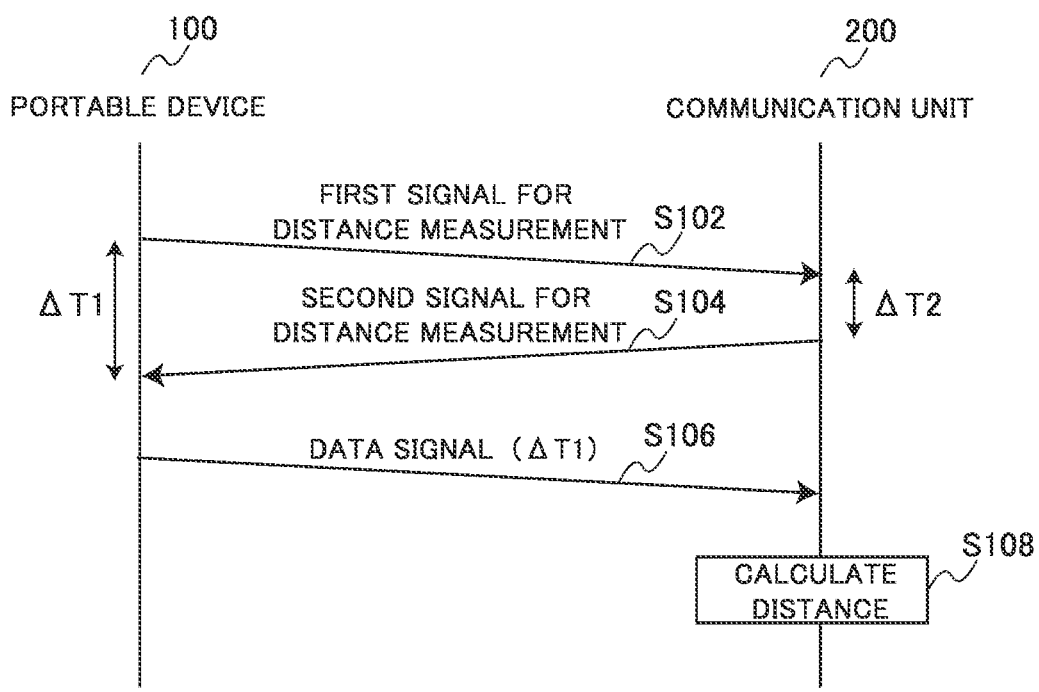
FIG. 2 is a sequence diagram illustrating an example of a flow of a distance measurement process which is executed by the system according to the present embodiment.

FIG. 2 is a sequence diagram illustrating an example of a flow of the distance measurement process which is executed by the system 1 according to the present embodiment. As shown in FIG. 2, the portable device 100 and the communication unit 200 is involved in this sequence.

As shown in FIG. 2, first, the wireless communication unit 110 of the portable device 100 transmits the first signal for distance measurement (step S102). Next, when the first signal for distance measurement is received from the portable device 100, the wireless communication unit 210 of the communication unit 200 transmits the second signal for distance measurement as a response to the first signal for distance measurement (step S104).

In this case, the control unit 230 of the communication unit 200 measures a time $\Delta T2$ from the reception time of the first signal for distance measurement to the transmission time of the second signal for distance measurement in the communication unit 200. On the other hand, when the second signal for distance measurement is received from the communication unit 200, the control unit 130 of the portable device 100 measures a time $\Delta T1$ from the transmission time of the first signal for distance measurement to the reception time of the second signal for distance measurement in the portable device 100.

Next, the wireless communication unit 110 of the portable device 100 transmits a data signal including information indicating the time $\Delta T1$ (step S106).

When the data signal is received, the control unit 230 of the communication unit 200 calculates the distance between the portable device 100 and the communication unit 200 on the basis of the measured time $\Delta T2$ and the time $\Delta T1$ indicated by the information contained in the data signal (step S108). Specifically, the control unit 230 calculates the propagation time of a one-way signal by dividing the difference ΔT1–ΔT2 by 2. The control unit 230 calculates the distance between the portable device 100 and the communication unit 200 (that is, distance measurement value) by multiplying such a propagation time by the speed of the signal.

(2) Relative Position Estimation Process

The communication unit 200 performs a relative position estimation process. The relative position estimation process is a process of estimating the relative position of the portable device 100 relative to the communication unit 200. The relative position of the portable device 100 relative to the communication unit 200 is a position at which the portable device 100 is located in the coordinate system based on the communication unit 200. Hereinafter, the relative position estimation process will be described in detail with reference to FIGS. 3 to 5.

Figure 3:
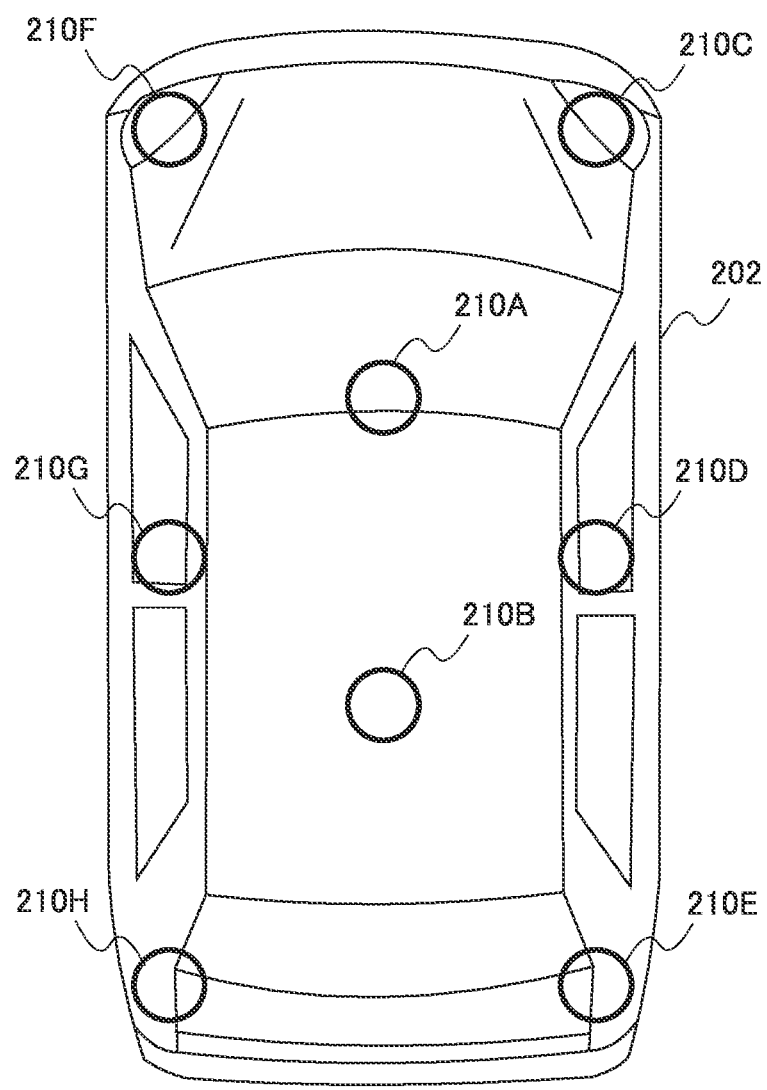
FIG. 3 is a diagram illustrating an example of arrangement of wireless communication units according to the present embodiment.

FIG. 3 is a diagram illustrating an example of arrangement of the wireless communication units 210 according to the present embodiment. As shown in FIG. 3, the vehicle 202 is provided with wireless communication units 210A to 210H. The positions at which the wireless communication units 210A to 210H are arranged are different from each other.

The control unit 230 estimates the relative position of the portable device 100 on the basis of a plurality of distance measurement values indicating the distance between each of the plurality of wireless communication units 210 and the portable device 100 obtained by each of the plurality of wireless communication units 210 performing wireless communication with the portable device 100 and a position characteristic including the position of each of the plurality of wireless communication units 210 in the communication unit 200. The result of wireless communication herein is the times ΔT1 and ΔT2 taken to transmit and receive the first signal for distance measurement and the second signal for distance measurement in the above-described distance measurement process. The distance measurement value herein is information indicating the distance between the wireless communication unit 110 and the wireless communication unit 210 that have transmitted and received the first signal for distance measurement and the second signal for distance measurement in the above-described distance measurement process. The position characteristic herein is the position of each of the wireless communication units 210A to 210H. That is, the control unit 230 estimates the relative position of the portable device 100 on the basis of the combination of the position of the wireless communication unit 210 and the distance measurement value in the wireless communication unit 210 with respect to each of the plurality of wireless communication units 210. It is possible to estimate the relative position of the portable device 100 with a high level of accuracy by using the plurality of distance measurement values.

The control unit 230 estimates the coordinates of the portable device 100 as the relative position of the portable device 100 in a coordinate system with a specific point where a relative positional relationship with the plurality of wireless communication units 210 is fixed as the origin. Such a coordinate system is also referred to as a local coordinate system below. An example of the local coordinate system is a coordinate system with the position of any one wireless communication unit 210 among the plurality of wireless communication units 210 as the origin. Another example of the local coordinate system is a coordinate system with the position of the control unit 230 as the origin. Another example of the local coordinate system is a coordinate system with any position of the vehicle 202 as the origin. An example of any position of the vehicle 202 is the central point of the vehicle 202. With such a configuration, it is possible to estimate the position of the portable device 100 in the local coordinate system with any point as the origin.

The position characteristic includes the position of each of the plurality of wireless communication units 210 in the communication unit 200. More specifically, the position characteristic includes the coordinates of each of the plurality of wireless communication units 210 in the local coordinate system. The position characteristic is stored in, for example, the storage unit 220 and is used for the relative position estimation process.

The control unit 230 estimates the relative position of the portable device 100 using at least three distance measurement values, obtained by each of at least three wireless communication units 210 among the plurality of wireless communication units 210 performing wireless communication with the portable device 100, as a plurality of distance measurement values used for the relative position estimation process. Specifically, the control unit 230 performs the above-described distance measurement process using each of the at least three wireless communication units 210. The control unit 230 estimates the relative position of the portable device 100 on the basis of the at least three distance measurement values obtained by the distance measurement process using each of the at least three wireless communication units 210.

Figure 4:
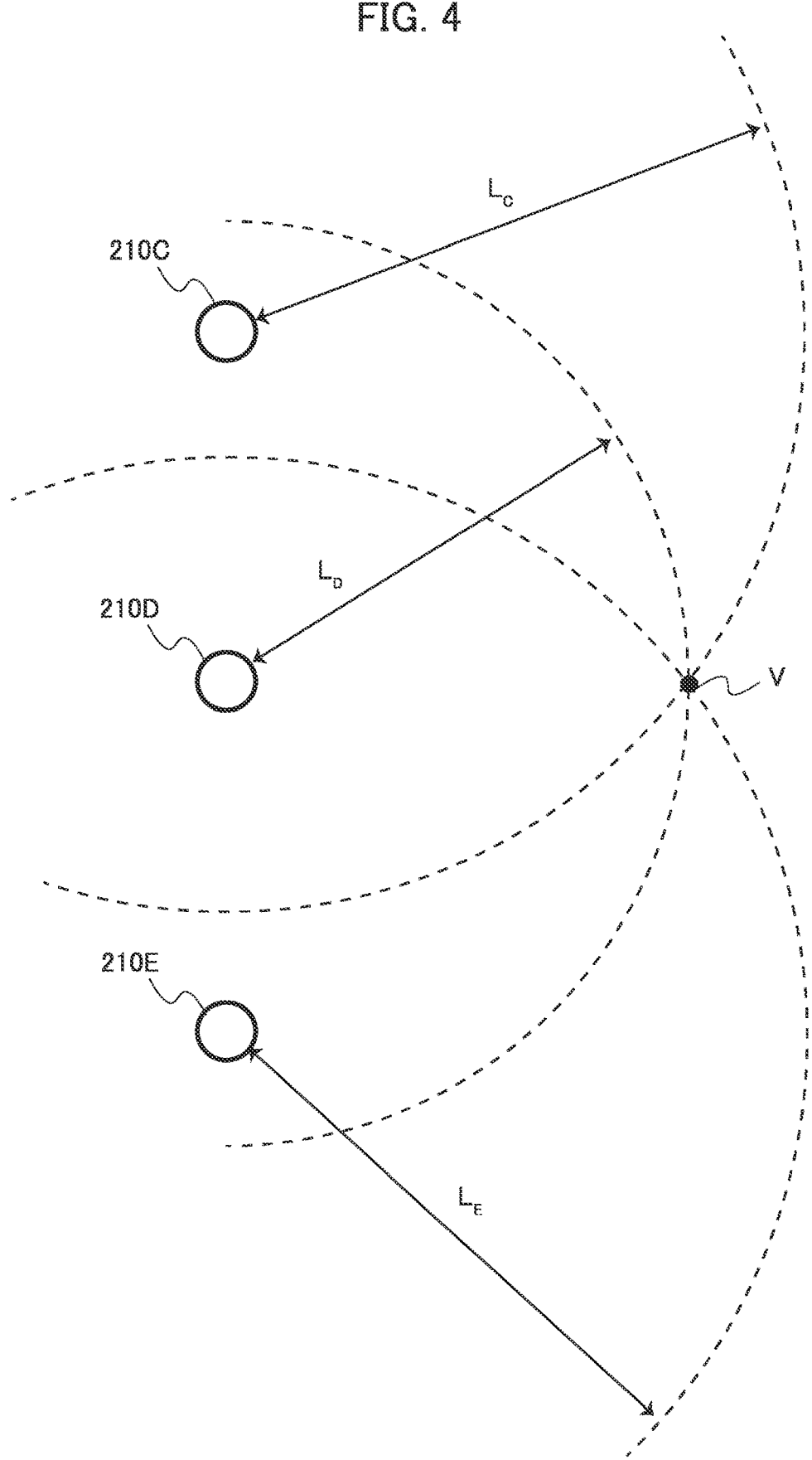
FIG. 4 is a diagram illustrating an example of a relative position estimation process according to the present embodiment.

An example of the relative position estimation process will be described with reference to FIG. 4. FIG. 4 is a diagram illustrating an example of the relative position estimation process according to the present embodiment. FIG. 4 shows an example in which the relative position of the portable device 100 is estimated on the basis of the distance measurement value obtained in accordance with the result of wireless communication performed by each of the wireless communication units 210C, 210D, and 210E. A distance $L_C$ is a distance measurement value obtained in accordance with the result of wireless communication performed by the wireless communication unit 110 and the wireless communication unit 210C. A distance $L_D$ is a distance measurement value obtained in accordance with the result of wireless communication performed by the wireless communication unit 110 and the wireless communication unit 210D. A distance $L_E$ is a distance measurement value obtained in accordance with the result of wireless communication performed by the wireless communication unit 110 and the wireless communication unit 210E.

In local coordinate system, the control unit 230 estimates coordinates satisfying the conditions that the distance from the coordinates of the wireless communication unit 210C is $L_C$, the distance from the coordinates of the wireless communication unit 210D is $L_D$, and the distance from the coordinates of the wireless communication unit 210E is $L_E$ as the relative position of the portable device 100. For example, the control unit 230 estimates the coordinates of an intersection point V with a circle of which the radius centered on the coordinates of the wireless communication unit 210C is the distance $L_C$, a circle of which the radius centered on the coordinates of the wireless communication unit 210D is the distance $L_D$, and a circle of which the radius centered on the coordinates of the wireless communication unit 210E is the distance $L_E$ as the relative position of the portable device 100.

As described above, according to the present embodiment, the relative position of the portable device 100 is estimated. The relative position herein is the coordinates of the portable device 100 in the local coordinate system. Therefore, according to the present embodiment, it is possible to estimate the relative position of the portable device 100 in more detail than a simple distance measurement value.

The control unit 230 may estimate a region in which the portable device 100 is located among a plurality of regions based on a communication unit 200 defined in advance, together with or instead of the coordinates of the portable device 100 in the local coordinate system, as the relative position of the portable device 100.

In that case, the position characteristic further includes a plurality of regions based on the communication unit 200. The plurality of regions based on the communication unit 200 can be defined as a plurality of regions in the local coordinate system. The control unit 230 estimates the region in which the portable device 100 is located among the plurality of regions included in the position characteristic as the relative position of the portable device 100. This point will be described with reference to FIG. 5.

Figure 5:
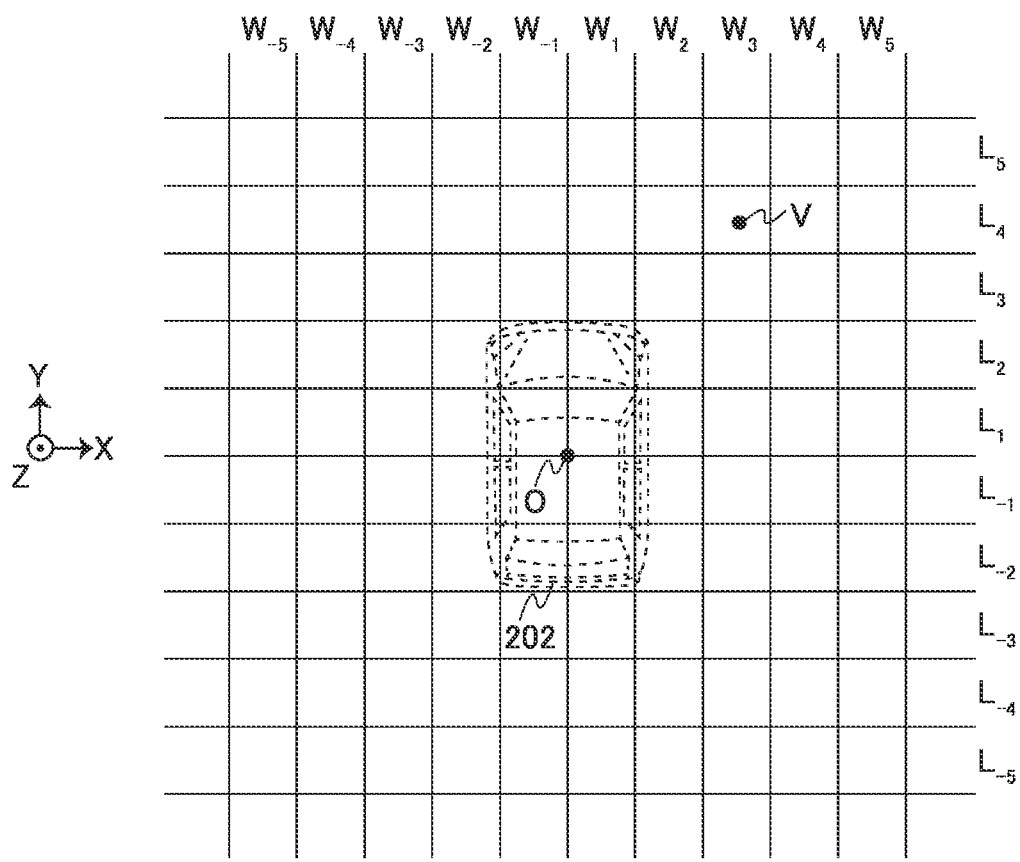
FIG. 5 is a diagram illustrating an example of the relative position estimation process according to the present embodiment.

FIG. 5 is a diagram illustrating an example of the relative position estimation process according to the present embodiment. In the example shown in FIG. 5, the origin O in the local coordinate system is the center of the vehicle 202. The X axis is an axis parallel to the left-right direction of the vehicle 202. The Y axis is an axis parallel to the front-back direction of the vehicle 202. The Z axis is an axis parallel to the up-down direction of the vehicle 202. As shown in FIG. 5, intervals $W_1, W_2, \ldots, W_5$ are defined for each predetermined distance from the origin O in the positive direction of the X axis. Intervals $W_{-1}, W_{-2}, \ldots, W_{-5}$ are defined for each predetermined distance from the origin O in the negative direction of the X axis. Intervals $L_1, L_2, \ldots, L_5$ are defined for each predetermined distance from the origin O in the positive direction of the Y axis. Intervals $L_{-1}, L_{-2}, \ldots, L_{-5}$ are defined for each predetermined distance from the origin O in the negative direction of the Y axis.

The plurality of regions based on the communication unit 200 are defined by a combination of intervals in the X-axis direction and intervals in the Y-axis direction. Meanwhile, although not shown in FIG. 5, intervals may be defined for the Z axis in the same manner as the X axis and the Y axis. In that case, the plurality of regions based on the communication unit 200 are defined by a combination of intervals in the X-axis direction, intervals in the Y-axis direction, and intervals in the Z axis direction. The storage unit 220 stores the coordinates of the start point and end point of each of the plurality of intervals defined in each of the plurality of axis directions as a position characteristic.

The control unit 230 identifies which of the plurality of regions defined in the position characteristic the coordinates of the portable device 100 in the local coordinate system belongs to. For example, in the example shown in FIG. 5, the intersection point V estimated in the process described above with reference to FIG. 4 belongs to a region which is defined by the interval $W_3$ and the interval $L_4$. Consequently, the control unit 230 estimates the region which is defined by the interval $W_3$ and the interval $L_4$ as the relative position of the portable device 100.

(3) Service Provision

The control unit 230 provides a service related to the vehicle 202 on the basis of the relative position of the portable device 100 estimated in the relative position estimation process.

As an example, the relative position of the portable device 100 is used for authentication which is performed between the portable device 100 and the communication unit 200. For example, the control unit 230 determines the success of authentication in a case where the relative position of the portable device 100 is included in a specified range. On the other hand, the control unit 230 determines the failure of authentication in a case where the relative position of the portable device 100 is not included in the specified range.

As another example, the relative position of the portable device 100 is used to lock and unlock the door lock of the vehicle 202. For example, the control unit 230 unlocks the door lock in a case where the relative position of the portable device 100 is included in the specified range. On the other hand, the control unit 230 locks the door lock in a case where the relative position of the portable device 100 is not included in the specified range.

As another example, the relative position of the portable device 100 is used to start and stop the engine of the vehicle 202. For example, the control unit 230 starts the engine in a case where the relative position of the portable device 100 is included in the specified range. On the other hand, the control unit 230 stops the engine in a case where the relative position of the portable device 100 is not included in the specified range.

As another example, the relative position of the portable device 100 is used for remote parking of the vehicle 202. Remote parking is a function of parking by remote control. For example, the control unit 230 makes it possible to perform remote parking in a case where the relative position of the portable device 100 is included in the specified range. On the other hand, the control unit 230 makes it impossible to perform remote parking in a case where the relative position of the portable device 100 is not included in the specified range.

Here, the specified range may be a specific region among a plurality of regions defined in the position characteristic. In that case, the determination of whether the relative position of the portable device 100 is included in the specified range is performed depending on whether the region estimated as the region at which the portable device 100 is located is included in the specific region.

Meanwhile, the specified range may differ depending on the type of service. That is, in the position characteristic, a plurality of regions may be defined for each type of service. In the relative position estimation process, the control unit 230 may estimate in which of the plurality of regions corresponding to the type of service to be provided the portable device 100 is located.

(4) Position Characteristic for Each Candidate of Mounting Destination Object

The storage unit 220 may store the position characteristic for each candidate of a mounting destination object in which the communication unit 200 can be mounted. In that case, the control unit 230 estimates the relative position of the portable device 100 on the basis of the position characteristic corresponding to the mounting destination object in which the communication unit 200 is mounted. The communication unit 200 can be mounted in various types of vehicles 202. In addition, the communication unit 200 can be mounted in other moving objects such as an airplane and a ship, and non-moving objects such as a building in addition to the vehicle 202. In this regard, the present configuration makes it possible to appropriately estimate the relative position of the portable device 100 even in a case where the communication unit 200 is mounted in any of candidates for mounting destination objects.

Table 1 shows an example of the position characteristics related to the positions of the plurality of wireless communication units 210 for each candidate of a mounting destination object.

TABLE 1

Example of position characteristic
for each candidate of mounting destination object

| Candidate of mounting destination object | Position of wireless communication unit 210A | Position of wireless communication unit 210B | |
|---|---|---|---|
| Vehicle A | $(X_A\text{-}A, Y_A\text{-}A, Z_A\text{-}A)$ | $(X_B\text{-}A, Y_B\text{-}A, Z_B\text{-}A)$ | . . . |
| Vehicle B | $(X_A\text{-}B, Y_A\text{-}B, Z_A\text{-}B)$ | $(X_B\text{-}A, Y_B\text{-}B, Z_B\text{-}B)$ | . . . |
| Vehicle C | $(X_A\text{-}C, Y_A\text{-}C, Z_A\text{-}C)$ | $(X_B\text{-}C, Y_B\text{-}C, Z_B\text{-}C)$ | . . . |

In the example shown in Table 1, a vehicle A, a vehicle B, and a vehicle C are listed as candidates for mounting destination objects. The coordinates of the wireless communication unit 210 in the local coordinate system for each candidate of the mounting destination object are stored in the storage unit 220 as a position characteristic. For example, in a case where the vehicle 202 in which the communication unit 200 is mounted is the vehicle A, the control unit 230 estimates the relative position of the portable device 100 with reference to the row of the vehicle A in Table 1.

Meanwhile, although it has been described above that the position characteristics related to the positions of the plurality of wireless communication units 210 are defined for each candidate of a mounting destination object in which the communication unit 200 can be mounted, the same applies to the position characteristics related to the plurality of regions. That is, the storage unit 220 may store the position characteristics related to the plurality of regions for each candidate of a mounting destination object in which the communication unit 200 can be mounted.

(5) Flow of Processing

Figure 6:
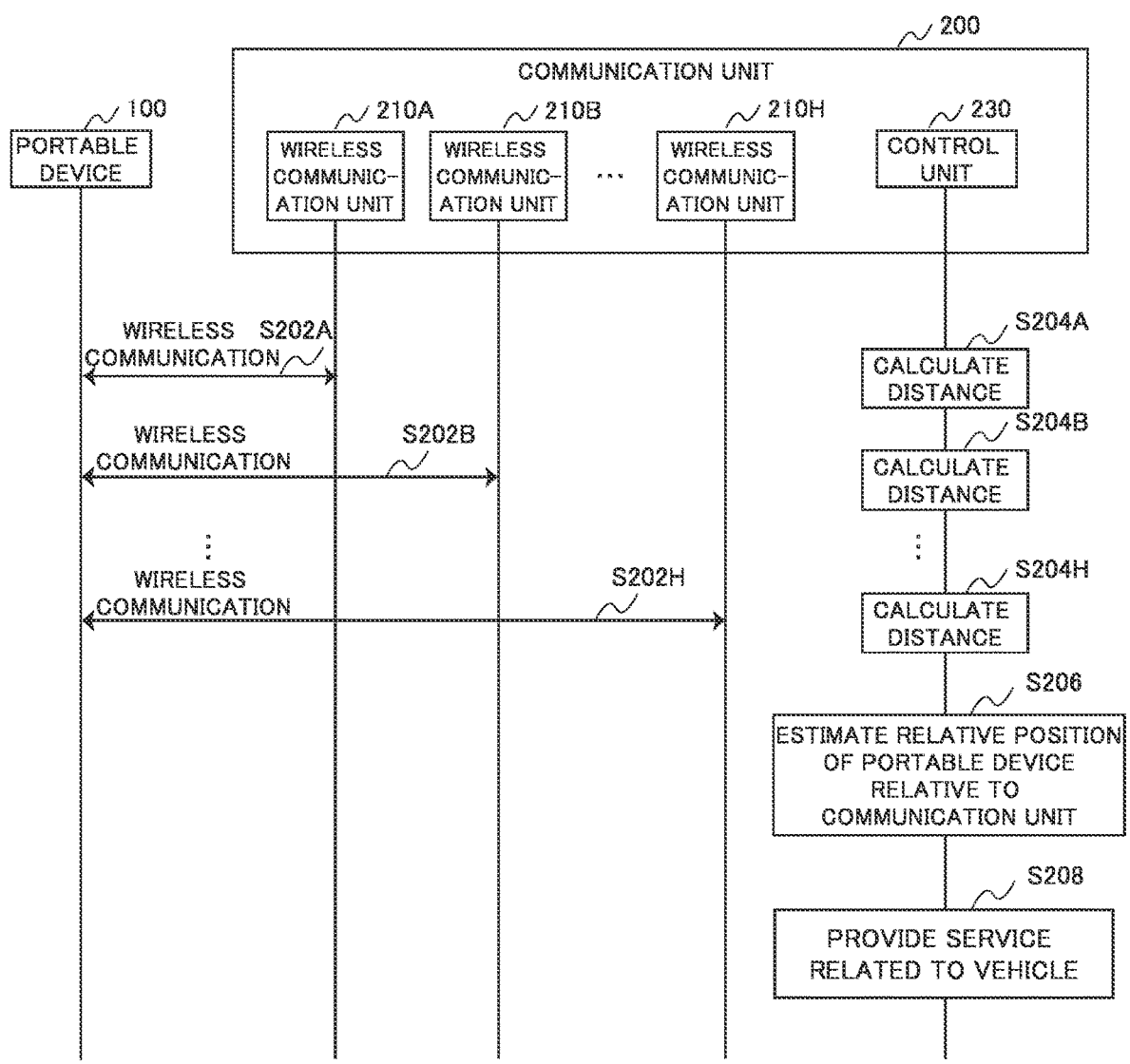
FIG. 6 is a sequence diagram illustrating an example of a flow of the relative position estimation process which is executed by the system according to the present embodiment.

FIG. 6 is a sequence diagram illustrating an example of a flow of the relative position estimation process which is executed by the system 1 according to the present embodiment. As shown in FIG. 6, the portable device 100 and the communication unit 200 are involved in this sequence. This sequence is a sequence in an example in which the wireless communication units 210A to 210H shown in FIG. 3 are arranged in the vehicle 202. In this sequence, for a process in which each of the plurality of wireless communication units 210 is involved, a sign containing the same alphabet as the alphabet attached to the end of the wireless communication unit 210 is attached at the end.

As shown in FIG. 6, first, the portable device 100 and the communication unit 200 perform the distance measurement process using the wireless communication unit 110 and the wireless communication unit 210A (steps S202A and S204A). Specifically, wireless communication is executed between the wireless communication unit 210A and the wireless communication unit 110 (step S202A). For example, as described above with reference to FIG. 2, the first signal for distance measurement, the second signal for distance measurement, and the data signal are transmitted and received between the wireless communication unit 210A and the wireless communication unit 110. Next, the control unit 230 calculates the distance between the wireless communication unit 210A and the portable device 100 in accordance with the result of wireless communication in step S202A (step S204A). These processes are as described above with reference to FIG. 2.

The communication unit 200 performs the distance measurement process using the wireless communication unit 110 and each of the wireless communication units 210B to 210H (steps S202B and S204B to steps S202H and S204H). The content of the process is as described above with respect to steps S202A and S204A.

The control unit 230 estimates the relative position of the portable device 100 relative to the communication unit 200 on the basis of a plurality of distance measurement values obtained by a plurality of distance measurement processes performed on the wireless communication units 210A to 210H (step S206).

The control unit 230 provides a service related to the vehicle 202 on the basis of the estimated relative position of the portable device 100 (step S208).

2. Second Embodiment

In the first embodiment, the communication unit 200 has estimated the relative position of the portable device 100 relative to the communication unit 200. On the other hand, in a second embodiment, the portable device 100 estimates the relative position of the portable device 100 relative to the communication unit 200.

(1) Configuration

The configurations of the portable device 100 and the communication unit 200 according to the present embodiment are as described above with reference to FIG. 1.

(2) Distance Measurement Process

The distance measurement process according to the present embodiment is the same as the distance measurement process according to the first embodiment.

In the present embodiment, the portable device 100 acquires a distance measurement value indicating the distance between the portable device 100 and the communication unit 200. As an example, the distance measurement value obtained by the distance measurement process described above with reference to FIG. 2 may be reported from the communication unit 200 to the portable device 100. As another example, the control unit 130 may calculate the distance between the wireless communication unit 110 and the wireless communication unit 210 by reversing the execution entity of each step in the distance measurement process described above with reference to FIG. 2 between the portable device 100 and the communication unit 200.

(3) Relative Position Estimation Process

The relative position estimation process according to the present embodiment is the same as the distance measurement process according to the first embodiment.

In the present embodiment, the portable device 100 estimates the relative position of the portable device 100 relative to the communication unit 200. Specifically, the control unit 130 estimates the relative position of the portable device 100 on the basis of a plurality of distance measurement values indicating the distance between the wireless communication unit 110 and each of the plurality of wireless communication units 210 obtained by the wireless communication unit 110 performing wireless communication with each of the plurality of wireless communication units 210 and the position characteristic including the position of each of the plurality of wireless communication units 210 in the communication unit 200. The details of the relative position estimation process are as described above in the first embodiment. In addition, the provision of a service and the position characteristic for each candidate of a mounting destination object are also as described above in the first embodiment.

(4) Flow of Processing

Figure 7:
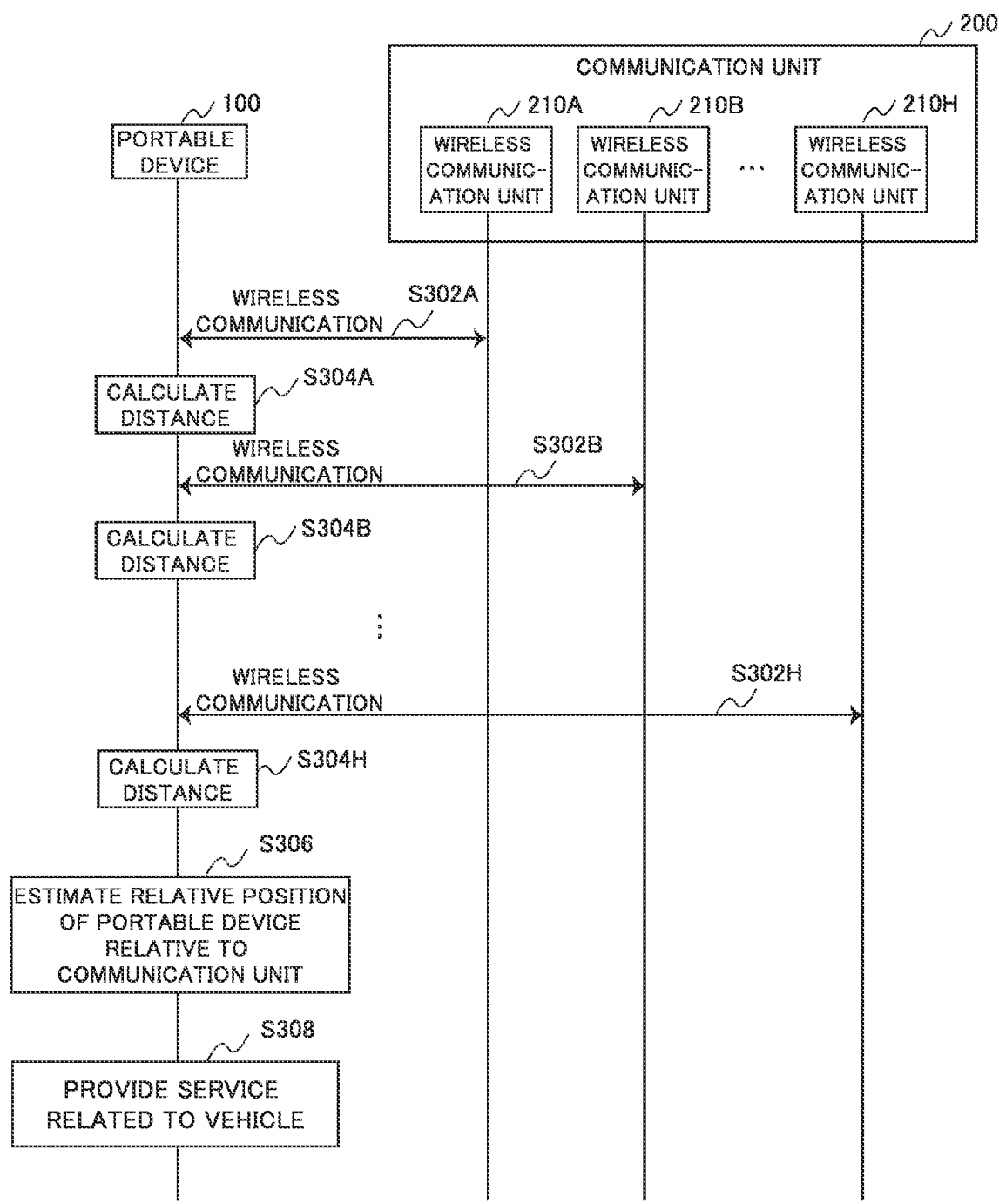
FIG. 7 is a sequence diagram illustrating an example of a flow of a relative position estimation process which is executed by a system according to a second embodiment.

FIG. 7 is a sequence diagram illustrating an example of a flow of the relative position estimation process which is executed by the system 1 according to the present embodiment. As shown in FIG. 7, the portable device 100 and the communication unit 200 are involved in this sequence. This sequence is a sequence in an example in which the wireless communication units 210A to 210H shown in FIG. 3 are arranged in the vehicle 202. In this sequence, for a process in which each of the plurality of wireless communication units 210 is involved, a sign containing the same alphabet as the alphabet attached to the end of the wireless communication unit 210 is attached at the end.

As shown in FIG. 7, first, the portable device 100 and the communication unit 200 perform the distance measurement process using the wireless communication unit 110 and the wireless communication unit 210A (steps S302A and S304A). In the present distance measurement process, the distance measurement process described above with reference to FIG. 2 is executed by reversing the execution entity of each step between the portable device 100 and the communication unit 200. Specifically, wireless communication is executed between the wireless communication unit 210A and the wireless communication unit 110 (step S302A). Next, the control unit 130 calculates the distance between the wireless communication unit 210A and the portable device 100 in accordance with the result of wireless communication in step S302A (step S304A).

The portable device 100 performs the distance measurement process using the wireless communication unit 110 and each of the wireless communication units 210B to 210H (steps S302B and S304B to steps S302H and S304H). The content of the process is as described above with respect to steps S302A and S304A.

The control unit 130 estimates the relative position of the portable device 100 relative to the communication unit 200 on the basis of a plurality of distance measurement values obtained by a plurality of distance measurement processes performed on the wireless communication units 210A to 210H (step S306).

The control unit 130 provides a service related to the vehicle 202 on the basis of the estimated relative position of the portable device 100 (step S308).

3. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, although an example in which a plurality of regions are defined in a rectangular shape has been described in the embodiment, the present invention is not limited to such an example. For example, the plurality of regions may be defined in a radially pattern centered on the origin in the local coordinate system. In addition, the size of each of the plurality of regions may differ for each region. For example, in the example described with reference to FIG. 5, the lengths of a plurality of intervals W defined in the X-axis direction may be different from each other. Similarly, the lengths of a plurality of intervals L defined in the Y-axis direction may be different from each other.

For example, although the wireless communication unit 210, the storage unit 220, and the control unit 230 have been described as separate components in the above embodiment, physical configurations for realizing these components are arbitrary.

Specifically, the wireless communication unit 210 and the function of calculating a distance measurement value on the basis of information obtained by wireless communication performed by the wireless communication unit 210 among the functions of the control unit 230 may be realized as one ECU (hereinafter also referred to as a distance measurement ECU). In that case, as an example, an ECU having a function of estimating the relative position of the portable device 100 (hereinafter also referred to as a relative position estimation ECU) among the functions of the control unit 230 may be provided separately from the distance measurement ECU. In that case, the distance measurement ECU transmits the distance measurement value obtained by performing the distance measurement process to the relative position estimation ECU. The relative position estimation ECU estimates the relative position of the portable device 100 on the basis of the distance measurement value received from the distance measurement ECU. As another example, any one of the plurality of distance measurement ECUs may also serve as the relative position estimation ECU.

Further, the distance measurement ECU may have a function of storing the position characteristic related to the position of the distance measurement ECU among the functions of the storage unit 220. In that case, the relative position estimation ECU can acquire the position characteristic from each distance measurement ECU at any timing such as a timing at which the portable device 100 and the communication unit 200 communicate with each other, and can estimate the relative position of the portable device 100.

In addition, for example, although it has been described in the above embodiment that the information indicating the time $\Delta T1$ from the transmission time of the first signal for distance measurement to the reception time of the second signal for distance measurement in the portable device 100 is included in the data signal, the present invention is not limited to such an example. The data signal may include information relating to the transmission time of the first signal for distance measurement and the reception time of the second signal for distance measurement. Hereinafter, another example of the information included in the data signal will be described.

Another example of the information included in the data signal is information indicating the transmission time of the first signal for distance measurement and the reception time of the second signal for distance measurement in the portable device 100. That is, the portable device 100 may transmit time stamps of the start and end of $\Delta T1$ without calculating $\Delta T1$.

Another example of the information included in the data signal is a distance measurement value indicating the distance between the portable device 100 and the communication unit 200 calculated on the basis of a time from the transmission time of the first signal for distance measurement to the reception time of the second signal for distance measurement. That is, the portable device 100 may calculate the distance measurement value indicating the distance between the portable device 100 and the communication unit 200, and transmit the calculated distance measurement value to the communication unit 200. For example, in a case where $\Delta T2$ is a fixed value, the portable device 100 can measure $\Delta T1$ to calculate the distance measurement value on the basis of the measured $\Delta T1$ and the fixed value $\Delta T2$.

For example, although an example in which the portable device 100 transmits the first signal for distance measurement has been described in the above embodiment, the present invention is not limited to such an example. For example, the communication unit 200 may transmit the first signal for distance measurement. In that case, when the first signal for distance measurement is received, the portable device 100 transmits the second signal for distance measurement as a response thereto. The portable device 100 transmits a data signal including information indicating the time ΔT2 from the reception time of the first signal for distance measurement to the reception time of the second signal for distance measurement. On the other hand, the communication unit 200 calculates the distance measurement value on the basis of the time ΔT1 from the transmission time of the first signal for distance measurement to the reception time of the second signal for distance measurement and the time ΔT2 included in the data signal. Meanwhile, ΔT2 may be a fixed value. In that case, the communication unit 200 can measure ΔT1 to calculate the distance measurement value on the basis of the measured ΔT1 and the fixed value ΔT2. Therefore, the portable device 100 may omit the transmission of the data signal including the information indicating ΔT2.

For example, it has been described that distance measurement is performed on the basis of the time taken to transmit and receive a signal for distance measurement in the above embodiment, but the present invention is not limited to such an example. Distance measurement may be performed on the basis of received power when a signal for distance measurement transmitted by one of the portable device 100 and the communication unit 200 is received by the other. In addition, distance measurement may be performed using a global navigation satellite system (GNSS).

For example, a UWB is used as a wireless communication standard in the above embodiment, but the present invention is not limited to such an example. For example, Bluetooth Low Energy (BLE (registered trademark)), Wi-Fi (registered trademark), and infrared rays may be used as wireless communication standards.

For example, an example in which the present invention is applied to a smart entry system has been described in the above embodiment, but the present invention is not limited to such an example. The present invention can be applied to any system that acquires position information by transmitting and receiving a signal. For example, the present invention can be applied to a pair including any two devices such as portable devices, vehicles, smartphones, drones, houses, and home electric appliances. One of the pairs is provided with at least three wireless communication units. One of the pairs acquires position information of the other. Meanwhile, the pair may include two devices of the same type, or may include two different types of devices.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using the flowcharts are not necessarily executed in the order illustrated in the drawings. Some processing steps may be executed in parallel. In addition, additional processing steps may be employed and some processing steps may be omitted.

REFERENCE SIGNS LIST

1 System
100 Portable device
110 Wireless communication unit
120 Storage unit
130 Control unit
200 Communication unit
202 Vehicle
210 Wireless communication unit
220 Storage unit
230 Control unit

The invention claimed is:

1. A communication unit configured to be mounted to a candidate mounting destination vehicle among a plurality of candidate mounting destination vehicles, the communication unit comprising:
   a plurality of wireless communication units configured to perform wireless communication with another communication device;
   a control unit configured to estimate a relative position of the another communication device relative to the communication unit; and
   a storage unit that stores a position characteristic for each candidate mounting destination vehicle among the plurality of candidate mounting destination vehicles,
   wherein
   the position characteristic of the candidate mounting destination vehicle to which the communication unit is mounted includes a position of each of the plurality of wireless communication units,
   the control unit estimates the relative position of the another communication device on the basis of:
      a plurality of distance measurement values indicating a distance between each of the plurality of wireless communication units and the another communication device obtained by each of the plurality of wireless communication units performing wireless communication with the another communication device; and
      the position characteristic corresponding to the candidate mounting destination vehicle to which the communication unit is mounted.

2. The communication unit according to claim 1, wherein the control unit estimates coordinates of the another communication device as the relative position of the another communication device in a coordinate system with a specific point where a relative positional relationship with the plurality of wireless communication units is fixed as an origin.

3. The communication unit according to claim 1, wherein the position characteristic for each candidate mounting destination vehicle among the plurality of candidate mounting destination vehicles further includes a plurality of regions based on the communication unit, and
   the control unit estimates a region from among the plurality of regions in which the another communication device is located,
   wherein the region corresponds to the candidate mounting destination vehicle to which the communication unit is mounted, wherein the region is defined as the relative position of the another communication device, and wherein the control unit provides a service related to the candidate mounting destination vehicle to which the communication unit is mounted on the basis of the estimated region.

4. The communication unit according to claim 1, wherein the control unit estimates the relative position of the another communication device using at least three distance measurement values, obtained by each of the at least three wireless communication units among the plurality of wireless communication units performing wireless communication with the another communication device, as the plurality of distance measurement values.

5. The communication unit according to claim 1, wherein the another communication device is a device which is carried and used by a user of the candidate mounting destination vehicle to which the communication unit is mounted and functions as a key for a smart entry system of the candidate mounting destination vehicle to which the communication unit is mounted.

6. A communication device configured to be mounted to a candidate mounting destination vehicle among a plurality of candidate mounting destination vehicles, the communication unit comprising:
 a wireless communication unit configured to perform wireless communication with a plurality of other wireless communication units provided in another communication device; and
 a control unit configured to estimate a relative position of the communication device relative to the another communication device; and
 a storage unit that stores a position characteristic for each candidate mounting destination vehicle among the plurality of candidate mounting destination vehicles,
 wherein
 the position characteristic of the candidate mounting destination vehicle to which the communication unit is mounted includes a position of each of the plurality of wireless communication units,
 the control unit estimates the relative position of the communication device on the basis of:
  a plurality of distance measurement values indicating a distance between the wireless communication unit and each of the plurality of other wireless communication units obtained by the wireless communication unit performing wireless communication with each of the plurality of other wireless communication units; and
  the position characteristic corresponding to the candidate mounting destination vehicle to which the communication unit is mounted.

7. A position estimating method comprising estimating a relative position of another communication device relative to a communication unit that is configured to be mounted to a candidate mounting destination vehicle among a plurality of candidate mounting destination vehicles, and the communication unit including a plurality of wireless communication units that perform wireless communication with the another communication device, the method further comprising:
 storing a position characteristic for each candidate mounting destination vehicle among the plurality of candidate mounting destination vehicles,
 wherein
 the position characteristic of the candidate mounting destination vehicle to which the communication unit is mounted includes a position of each of the plurality of wireless communication units,
 estimating the relative position of the another communication device includes estimating the relative position of the another communication device on the basis of:
  a plurality of distance measurement values indicating a distance between each of the plurality of wireless communication units and the another communication device obtained by each of the plurality of wireless communication units performing wireless communication with the another communication device; and
  the position characteristic corresponding to the candidate mounting destination vehicle to which the communication unit is mounted.

* * * * *